United States Patent [19]

Butschbacher et al.

[11] Patent Number: 5,741,824
[45] Date of Patent: Apr. 21, 1998

[54] ACOUSTICALLY ACTIVE PLASTISOLS

[75] Inventors: Günter Butschbacher, Meckenheim; Manfred Rein, Hirschberg; Klaus Ruch, Wiesloch; Karl Wesch, Waldbrunn, all of Germany

[73] Assignee: Teroson GmbH, Heidelberg, Germany

[21] Appl. No.: 557,038

[22] PCT Filed: May 31, 1994

[86] PCT No.: PCT/EP94/01767

§ 371 Date: Dec. 7, 1995

§ 102(e) Date: Dec. 7, 1995

[87] PCT Pub. No.: WO94/29394

PCT Pub. Date: Dec. 22, 1994

[30] Foreign Application Priority Data

Jun. 7, 1993 [DE] Germany .................. 43 18 712.9

[51] Int. Cl.[6] .......................................... C08J 9/30
[52] U.S. Cl. .................... 521/73; 427/180; 427/195; 427/421; 428/461; 428/500; 521/75; 521/146; 521/149

[58] Field of Search .................... 521/149, 73, 75, 521/146; 428/461, 500; 427/100, 195, 421

[56] References Cited

FOREIGN PATENT DOCUMENTS

| | | |
|---|---|---|
| 0544201 | 6/1993 | European Pat. Off. . |
| 3444863 | 7/1986 | Germany . |
| 3514753 | 10/1986 | Germany . |
| 3830345 | 11/1989 | Germany . |
| 4034725 | 5/1992 | Germany . |
| 4013318 | 10/1992 | Germany . |

*Primary Examiner*—John M. Cooney, Jr.
*Attorney, Agent, or Firm*—Wayne C. Jaeschke; John Daniel Wood; Daniel S. Ortiz

[57] ABSTRACT

The invention relates to acoustically active sprayable plastisol compositions based on styrene copolymers and/or alkyl methacrylate homopolymers and/or copolymers of methyl methacrylate which, in addition to the favorable abrasion properties and corrosion-preventing properties of the plastisols, have a good vibration-damping effect and distinctly reduce the noise caused by particle impact (chippings, water, sand).

22 Claims, 3 Drawing Sheets

ACOUSTICALLY ACTIVE PLASTISOLS

BACKGROUND OF THE INVENTION

1. Field of the Invention

This invention relates to the use of sprayable plastisol compositions for soundproofing.

2. Discussion of the Related Art

Nowadays, very thin metal plates are almost exclusively used in the production of vehicles, machines and appliances. Under the effect of mechanically moving parts or running engines, these thin plates are inevitably made to vibrate, generating sound in the process. Another cause of troublesome noise, particularly in travelling motor vehicles, are the particles (stains and chippings, sand, water) which are thrown up by the wheels against the wheel arches and the underbody of the vehicle. This noise is particularly troublesome and unpleasant because it contains a large percentage of relatively high-frequency sound components.

Numerous proposals have been put forward with a view to reducing both types of sound. Accordingly, to reduce sound emission and mechanical vibration, the plates used in particular in automotive construction and in the manufacture of domestic appliances are provided with soundproofing coatings, so-called antivibration coatings.

In the conventional process, mixtures of fillers of high specific gravity and bitumen are extruded to sheets from which the corresponding shapes are then stamped or cut out. They are then bonded to the metal parts in question and may have to be adapted to the shape thereof by heating. Although these bitumen sheets are extremely brittle and tend to flake off the plate, particularly at low temperatures, they are still commonly used by virtue of their low price. Even the frequently proposed additions of elastomers produce only a slight improvement which is inadequate for many applications. In addition, the preformed bitumen shapes are impossible to apply to intricately shaped or awkwardly situated parts of machines or motor vehicles, for example the inner surfaces of the hollow interiors of motor vehicle doors. Another disadvantage is that, in many cases, several different shapes are required for a single vehicle or appliance, so that expensive stock-keeping is necessary.

Accordingly, there has been no shortage of attempts, to eliminate the disadvantages of bitumen sheets by using other polymer systems. For example, filler-containing aqueous polymer dispersions of polyvinyl acetate or ethylene/vinyl acetate copolymers have been developed for spraying onto the metal parts in the necessary layer thickness. Unfortunately, these systems are unsuitable for industrial use for high-volume production because the water present in the layer applied by spraying cannot be removed quickly enough, particularly from relatively thick layers.

The soundproofing properties of polymer coatings are at their best in the vicinity of the glass transition temperature of the polymer system because, at temperatures in this range, the mechanical vibration energy is converted into heat through molecular flow processes by virtue of the viscoelasticity of the polymer. Conventional sprayable coating materials based on PVC plastisols, which are widely used for example for undersealing in the automotive industry, have no significant soundproofing effect in the working temperature range from −20° C. to +60° C. because the maximum glass transition temperature is in the range from about −20° C. to −50° C., depending on the plasticizer content.

Accordingly, attempts have been made to modify these conventional PVC plastisols in such a way that they would have better soundproofing properties in the working temperature range from −20° C. to +60° C. Thus, DE-A-35 14 753 describes coatings which contain polyunsaturated compounds, for example diacrylates or triacrylates, peroxide crosslinkers and inorganic fillers in typical PVC plastisols. However, in their cured state, plastisols such as these are as hard as glass and brittle so that they are unsuitable for use in automobile construction because they lack flexibility, particularly at low temperatures. In addition, these formulations have a very low loss factor (tan $\delta$), so that their soundproofing effect is not very pronounced.

DE-A-34 44 863 describes compositions containing PVC or vinyl chloride/vinyl acetate copolymers, optionally methyl methacrylate homopolymers or copolymers, a plasticizer mixture and inert fillers. The plasticizer mixture consists of plasticizers compatible with the methyl methacrylate polymers and plasticizers for the vinyl chloride polymers which are incompatible with the methacrylate polymer optionally present. The plastisols thus obtained have improved soundproofing properties in relation to conventional PVC plastisols. However, their soundproofing effect deteriorates again, particularly at temperatures above about 30° C. If an attempt is made to shift the range of the maximum loss factor (tan $\delta$) to higher temperatures by varying the quantitative ratios between the individual components, the coating suffers a very significant reduction in its flexibility at low temperatures. However, reduced flexibility at low temperatures is particularly problematical for applications in automotive construction. In addition, the loss factor of these formulations is drastically reduced at lower temperatures. Accordingly, plastisol compositions of the type in question only ever have a sufficiently high loss factor over a very narrow temperature range. As already mentioned, the compositions according to DE-A-34 44 863 require a plasticizer mixture in which one of the plasticizers has to be compatible with the methacrylate and incompatible with the PVC while the other plasticizer has to be compatible with the PVC and incompatible with the methacrylate polymer. This seriously restricts the choice of suitable plasticizers, the polymethacrylate-compatible plasticizers in particular being extremely expensive so that it is desirable for this reason also to find simpler and more economical alternatives.

DE-C-38 30 345 proposes a sprayable plastisol composition consisting of a mixture of a first polymer component, which forms the continuous phase after gelation of the plastisol, and a second lightly crosslinked polymer component which is only partly swollen after gelation of the plastisol and which is dispersed in the continuous phase, the continuous phase largely being responsible for the mechanical properties, such as abrasion resistance, flexibility at low temperatures, hardness and adhesion to the substrate while the finely dispersed, swollen polymer phase is largely responsible for the soundproofing properties of the gelled coating.

To reduce the noise caused by particle impact, DE-C-40 13 318 proposes two-layer coatings consisting of an inner, soft layer and an outer layer which largely prevents the abrasion of the coating as a whole. Although DE-C-40 13 318 may well be capable of damping mechanical vibration and of reducing the noise caused by particle impact, two coatings have to be successively applied to the substrates to achieve these objectives. This involves the storage of two materials and the use of two application systems. To simplify application in vehicle construction, it is desirable to have coatings which can be applied in a single layer and, preferably, with an existing application system.

In addition, to reduce environmental pollution, it is desirable to have plastisol compositions which can be formulated without any chlorine.

Accordingly, the problem addressed by the present invention was to provide a coating for stiff substrates, more particularly for metal plates in the underbody region of motor vehicles, including wheel arches, which has a vibration-damping effect and also inhibits corrosion and is resistant to abrasion and which significantly reduces the noise caused by particle impact and, in addition, can be applied as a single coating using existing plastisol application systems and is preferably free from chlorine.

SUMMARY OF THE INVENTION

It has now suprisingly been found that coatings of plastisol compositions based on styrene copolymers containing 2 to 20% by weight of an olefinically unsaturated carboxylic acid as comonomer are both corrosion-inhibiting and abrasion-resistant and, at the same time, have a vibration-damping effect and significantly reduce the noise caused by particle impact. Plastisols based on these styrene copolymers and their use as abrasion-resistant coatings are known per se from DE-A-40 34 725. However, it is both novel and surprising that coatings of the type in question are also suitable for noise damping. This additional property enables the requirements of the automotive industry to be satisfied, i.e. to combine the functions of underbody protection (against abrasion) and noise reduction in one and the same product.

Accordingly, the present invention relates to sprayable plastisol compositions which can be sprayed on with conventional plastisol application systems and can be conventionally gelled. The plastisol compositions according to the invention are characterized in that they contain:

a) 5 to 60% by weight of at least one powder-form styrene copolymer and/or alkyl methacrylate homopolymer and/or copolymer of methyl methacrylate, b) 5 to 65% by weight of plasticizers, c) 0 to 40% by weight of fillers, d) 2 to 40% by weight of reactive additives, e) optionally other auxiliaries and additives typically encountered in plastisol technology, the sum of the individual components being 100% by weight.

DETAILED DESCRIPTION OF THE INVENTION

Particularly styrene copolymers described in DE-A-40 34 725 and are specially regarded as part of the present invention.

In addition, copolymers of methyl methacrylate with 5 to 48% by weight of a $C_{2-8}$ alkyl ester of methacrylic acid and 0.5 to 4% by weight of a coupling and/or cross-linking comonomer are also suitable for the plastisols according to the invention without any need for PVC or a second plasticizer to be added. Particularly suitable coupling comohomers for the methacrylate copolymers are N-vinyl imidazole or acrylic acid or methacrylic acid.

Alkyl methacrylate homopolymers, more particularly the $C_{2-8}$ alkyl esters of methacrylic acid, optionally containing 0.5 to 4% by weight of a coupling and/or crosslinking comonomer are also suitable for the plastisols according to the invention. Other particularly suitable coupling comonomers for the alkyl methacrylate homopolymers are N-vinyl imidazole or acrylic acid, methacrylic acid or itaconic acid. Ethyl methacrylate has proved to be a particularly suitable alkyl methacrylate.

Combinations of the above-mentioned styrene copolymers and the copolymers of methyl methacrylate or the alkyl methacrylate homopolymers either as a two-component combination or even as a combination of all three polymers may also be used for the plastisol compositions according to the invention.

Suitable crosslinking comonomers both for the methacrylate copolymers and for the styrene copolymers are those functional monomers which, in addition to the olefinically unsaturated double bond, contain a functional group which does not react during the radical polymerization for preparing the copolymer, but instead is only available for crosslinking reactions during gelation of the plastisol. This additional functional group may be, for example, an epoxy, (blocked) isocyanate or hydroxy group.

Suitable plasticizers are generally any conventional plasticizers (cf. for example Paul E. Broins, Plasticizer Technology [Weinhold Publ. Corp. New York], Vol. 1, pages 228–232). Alkyl phthalates, such as dibutyl phthalate, dioctyl phthalate, benzylbutyl phthalate, dibenzyl phthalate, diisononyl phthalate (DINP), diisodecyl phthalate (DIDP) and diundecyl phthalate (DIUP), are preferred. However, the known plasticizers from the group of organic phosphates, adipates and sebacates or even benzyl benzoate, alkylsulfonic acid esters of phenol or cresol, dibenzyltoluene or diphenylether are also suitable. The selection criteria for the plasticizers preferably used are determined on the one hand by the polymer composition and on the other hand by the viscosity and gelation conditions of the plastisol and by the required acoustic properties.

Suitable fillers for the plastisols according to the invention are any fillers known per se such as, for example, calcium carbonate in the form of the various chalks, heavy spar, mica and vermiculite, heavy spar being particularly preferred.

The plastisols according to the invention may contain reactive additives, depending on the crosslinking comonomers used in the copolymer. In the case of hydroxyfunctional comonomers, diisocyanates or polyisocyanates may be added preferably in blocked or microencapsulated form; in the case of epoxyfunctional comonomers, diamines or polyamines or polyaminoamides are preferably added; in the case of (blocked) isocyanate-functional comonomers, aminofunctional and/or hydroxyfunctional additives may be used. The polyaminoamides may also be added with advantage in cases where no crosslinking comonomer has been incorporated in the copolymer because they are capable of entering into a crosslinking reaction with the carboxyl groups of the copolymer(s) present in excess. The plastisol compositions may even contain mixtures of copolymers. In addition, both the plastisols based on the styrene copolymers and the plastisols based on the methacrylate copolymers may contain an addition of methyl methacrylate homopolymer.

In addition, the plastisols according to the invention may optionally contain other auxiliaries and additives typically encountered in plastisol technology, including for example pigments, antiagers, flow aids and also blowing agents for the production of foamed plastisols. Suitable blowing agents are any blowing agents known per se, preferably organic blowing agents from the class of azo compounds, N-nitroso compounds, sulfonyl hydrazides or sulfonyl semicarbazides. Azo-bis-isobutyronitrile and, in particular, azodicarbonamide are mentioned as examples of azo compounds; dinitrosopentamethylenetetramine is mentioned as an example of a nitroso compound; 4,4'-oxy-bis-(benzenesulfonic acid hydrazide) is mentioned as an example of a sulfohydrazide;

and p-toluenesulfonyl semicarbazide is mentioned as an example of a semicarbazide.

The foamed plastisols are particularly suitable for reducing noise caused by particles (stones and chippings, sand, water) impacting on travelling motor vehicles. Since it is mainly the wheel arches and parts of the underbody that are affected in this way, the foamed plastisols are also preferably used in these areas.

Another application for the foamed plastisols is their use as so-called pillar fillers in cavities, such as the roof cross-ties or the A-, B- and/or C-pillars of a motor vehicle. In cases such as these, the entire, cross-section of the cavity is filled with the foamed plastisol along the lines of a plug to prevent the columns of air trapped in the cross-ties from being able to begin vibrating.

Even if it is mainly vibration-damping properties, that are to be achieved with the plastisol coating, this effect can often be enhanced by foaming.

The plastisols according to the invention are surprisingly distinguished by a high loss factor which is necessary for effective vibration damping. This loss factor was determined in known manner either by dynamic/mechanical thermoanalysis (DMTA) or by the Oberst flexural fatigue test.

To determine the reduction in the noise produced by particle impact (chippings, water spray and the like), plates coated with the plastisols according to the invention were tested by the APAMAT (R) method. In this method, balls are projected against the coated side of the plate and the sound pressure spectrum of the coated plate is compared with the sound pressure spectrum of an untreated plate. The difference between the two sound pressures is plotted against the frequency.

The invention is illustrated by the following Examples which are purely illustrative in character and do not cover the entire range of the plastisols according to the invention. However, the full range of plastisols according to the invention may be worked out by the expert from the foregoing observations.

TABLE 1

| Example | 1 | 2 | 3 | 4 | 5 | 6 | 7 | 8 | 9 | 10 | 11 |
|---|---|---|---|---|---|---|---|---|---|---|---|
| Styrene copolymer 1 | | | | | | | | 35 | 30 | 40 | 40 |
| PMMA copolymer 1 | | | | | 35 | 35 | 30 | | | | |
| PMMA copolymer 2 | 35 | 35 | 35 | 35 | | | 5 | | 5 | | |
| Lipinol T | 36 | 26 | | | | | | | | | |
| DINP | | | | | 36 | 26 | 36 | 36 | 36 | | |
| DIDP | | | | | | | | | | 9.4 | 9.4 |
| DIUP | | | | | | | | | | 26.6 | 26.6 |
| Mesamoll | | | 36 | 26 | | | | | | | |
| Gasoline | 3 | 5 | 3 | 5 | 3 | 5 | 3 | 3 | 3 | 5 | 5 |
| Barium sulfate | 24.7 | 33.7 | 24.7 | 33.7 | 24.7 | 33.7 | 24.7 | 24.7 | 24.7 | 17.7 | 17.7 |
| Calcium oxide | 1 | 2 | 1 | 2 | 1 | 2 | 1 | 1 | 1 | 1 | 1 |
| Aerosil 200 | 0.3 | 0.3 | 0.3 | 0.3 | 0.3 | 0.3 | 0.3 | 0.3 | 0.3 | 0.3 | 0.3 |
| Versamid 140 | | | | | | | | | | | 1.5 |
| DMTA | | | | | | | | | | | |
| log G" max | 6.86 | 6.83 | 6.74 | 6.76 | 6.74 | 6.75 | 6.83 | 6.75 | 6.81 | 6.74 | 6.79 |
| at temp. (°C.) | 14.5 | 28.0 | 23.0 | 35.0 | 9.0 | 18.0 | 8.0 | 26.5 | 26.0 | 41.0 | 40.0 |

TABLE 2

| Example | 12 | 13 | 14 | 15 | 16 | 17 | 18 |
|---|---|---|---|---|---|---|---|
| Styrene copolymer 1 | 40 | | 40 | 40 | 35 | 50 | 30 |
| Styrene copolymer 2 | | 40 | | | | | |

TABLE 2-continued

| Example | 12 | 13 | 14 | 15 | 16 | 17 | 18 |
|---|---|---|---|---|---|---|---|
| DINP | | | | | | | 12 |
| DIDP | 20 | 35 | 35 | | 5 | 39 | |
| DIUP | | | | 35 | 30 | | |
| Vestinol TD | 15 | | | | | | |
| DIDA | | | | | | | 10 |
| Edenol 190 | | | | | | | 3 |
| Chalk, ground | | | | | | | 25 |
| CaO | 1.5 | 2 | 2 | 1.5 | 1.6 | 1.0 | 1 |
| BaSO$_4$ | 17 | 12.5 | 12.5 | 14.5 | 14.5 | 15.0 | 15 |
| Aerosil 200 | 1.5 | | | | | | |
| Gasoline | | 5 | 5 | 5 | 5 | 5 | 5 |
| Epoxy resin | | 4 | | 4 | 4 | | |
| Versamid 140 | | | | | | 1.5 | |
| PMMA polymer 3 | | 5 | | | 5 | | |

TABLE 3

Acoustic damping according to DIN 53440

| | Example | | | | | | |
|---|---|---|---|---|---|---|---|
| Measuring temperature | 12 | 13 | 14 | 15 | 16 | 17 | 18 |
| −10° C. | 0.039 | 0.048 | 0.053 | 0.045 | 0.045 | 0.064 | 0.038 |
| 0° C. | 0.042 | 0.053 | 0.064 | 0.053 | 0.047 | 0.068 | 0.040 |
| 10° C. | 0.052 | 0.060 | 0.070 | 0.064 | 0.054 | 0.083 | 0.052 |
| 20° C. | 0.062 | 0.069 | 0.081 | 0.078 | 0.067 | 0.093 | 0.069 |
| 30° C. | 0.083 | 0.081 | 0.045 | 0.092 | 0.083 | 0.055 | 0.080 |
| 40° C. | 0.076 | 0.064 | 0.018 | 0.068 | 0.064 | 0.025 | 0.046 |

EXAMPLE 19

A plastisol of the following composition was prepared on the basis of methacrylate polymers:

| | |
|---|---|
| PMMA copolymer 2 | 15.0 parts |
| PMMA polymer 3 | 15.0 parts |
| Lipinol T | 26.97 parts |
| Chalk, ground | 5.0 parts |
| Calcium oxide powder | 3.50 parts |

| | |
|---|---|
| Barium sulfate | 22.0 parts |
| Coupling agent (phenolic resin) | 2.0 parts |
| Aliphatic hydrocarbons | 3.5 parts |
| Carbon black pigment | 0.03 part |

EXAMPLE 20

A foamable plastisol was produced from the plastisol of Example 19 by addition of 7 parts of a paste-form blowing agent consisting of 40 parts of Lipinol T, 15 parts of calcium carbonate, 15 parts of urea, 7.5 parts of zinc stearate and 22.5 parts of azodicarbonamide.

The damping effect of the plastisol according to the Example 19 was tested by the Oberst method. In addition, plates coated with the plastisols of Examples 19 and 20 were tested by the APAMAT method.

Comparison Test

A PVC plastisol of the following composition was prepared in known manner for comparison purposes:

| | |
|---|---|
| Emulsion PVC paste | 32.0 parts |
| Dioctyl phthalate | 30.0 parts |
| Ground natural chalk | 16.5 parts |
| Precipitated chalk | 6.0 parts |
| Calcium oxide | 3.0 parts |
| Pigment (mixture of metal oxides) | 1.0 part |
| Pigment black | 0.1 part |
| PVC stabilizers | 1.0 part |
| Coupling agent | 2.0 parts |
| Pyrogenic silica | 0.4 part |
| Hydrocarbon mixture | 8.0 parts |

The acoustic damping values of the PVC plastisol mentioned above were determined by the Oberst method. In addition, coated plates were tested by the APAMAT method. Observations on Examples 1 to 20:

The styrene copolymer 1 of Examples 8 to 12 and 14 to 18 is a styrene copolymer containing 6.4% of methacrylic acid as described in DE-A-40 34 725; the styrene copolymer 2 contains 7.5% of methacrylic acid.

The PMMA copolymer 1 is a carboxyfunctional methyl methacrylate copolymer consisting of approximately 63% of methyl methacrylate, approximately 35% of butyl methacrylate and approximately 2% of methacrylic acid.

The PMMA copolymer 2 contains approximately 83% of methyl methacrylate, approximately 15% of butyl methacrylate and approximately 2% of N-vinyl imidazole.

The PMMA polymer 3 contains approximately 98% of methyl methacrylate and approximately 2% of vinyl imidazole ("methyl methacrylate homopolymer").

Lipinol T (dibenzyl toluene, a product of Hüls)

DINP: diisononyl phthalate

DIDP: diisodecyl phthalate

DIUP: diisoundecyl phthalate

Mesamoll (phenol ester of a mixture of aliphatic sulfonic acids, a product of Bayer AG)

Edenol 190 (tallow fatty acid octyl ester, a product of Henkel KGaA)

Aerosil 200 (pyrogenic silica, a product of Degussa AG)

Versamid 140 (polyaminoamide based on dimer fatty acids, a product of Witco)

Vestinol TD (tridecyl phthalate, a product of Hüls) DIDA: diisodecyl adipate

All the plastisols listed in the Table were gelled for 25 minutes at 160° C., the quantities shown being parts by weight. Compounding was carried out in dissolvers. By virtue of their viscosity (around 1 to 3 Pa.s. as measured at 23° C. with a Contraves Rheomat 30, System 14), the plastisols are sprayable compositions and are distinguished by high stability in storage.

The damping values shown in Table 1 were determined by dynamic/mechanical thermoanalysis (DMTA) at 10 Hz, using a Polymer Laboratories Dynamic/Mechanical Thermoanalyzer.

As can clearly be seen from the DMTA measurements, the loss factors (logG") can be varied within wide limits by suitably selecting the polymer composition and the plasticizers in the plastisol mixtures. In addition, all the compositions exhibited good performance properties as underbody protection and significantly reduced the noise caused by particle impact.

The loss modulus G" is measured in Pa and has its maximum in the vicinity of the glass transition temperature of the corresponding coating material.

The acoustic damping values (dcombi) shown in Table 3 were determined in accordance with DIN 53440, the Oberst method, at 200 Hz, a coating weight of 50% being used as the standard, i.e. the weight of the coating with the soundproofing plastisol amounted to 50% of the weight of the metal strip. The dimensions of the sprung steel strips were 240×10 mm for a thickness of 1 mm. The metal strips were coated with the plastisol according to the invention over a length of 200 mm.

The plastisols were applied to the sprung steel strips using a thin coating of primer and were then gelled for 25 minutes at 160° C.

BRIEF DESCRIPTION OF DRAWINGS

FIG. 1 shows the dependence on temperature of the loss factor of a conventional PVC plastisol of the Comparison Example (1,2) by comparison with Examples 14 (3,5) and 18 (4,6) according to the invention for two different layer thicknesses of the plastisol on the steel strips.

| Curve | Formulation | Coating thickness |
|---|---|---|
| 1: | Comparison Example | 2.27 mm |
| 2: | Comparison Example | 4.52 mm |
| 3: | Example 14 | 2.0 mm |
| 4: | Example 18 | 2.0 mm |
| 5: | Example 14 | 4.0 mm |
| 6: | Example 18 | 4.0 mm |

Figure 1:
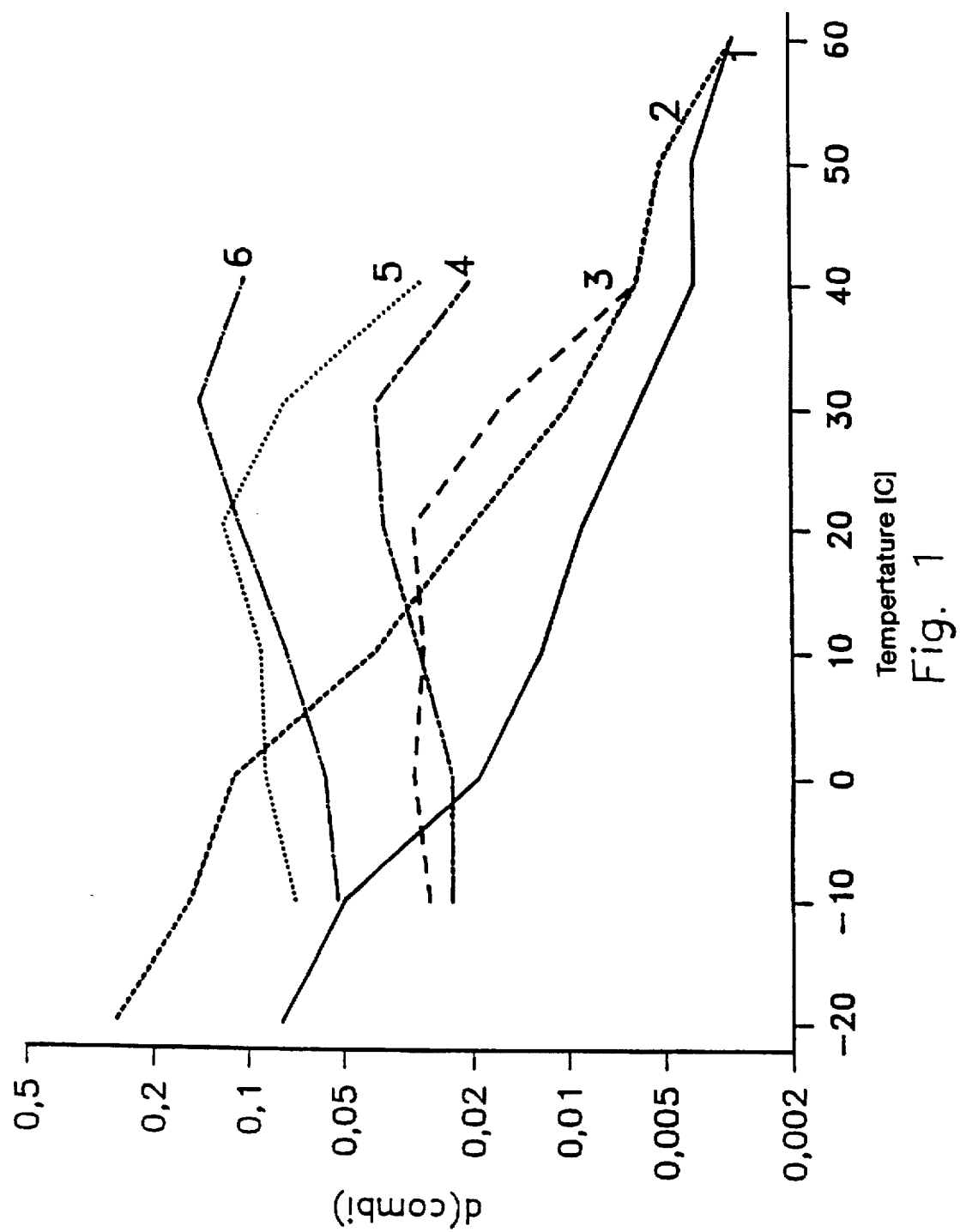
FIGS. 1 and 2 show the combined loss factor at 2.00 Hz of coated steel strips in accordance with DIN 53440, Part 3.

It can clearly be seen from FIG. 1 that, particularly in the temperature range of 0° to 35° C. important to the performance properties, the plastisols according to the invention have a distinctly higher loss factor than the conventional PVC plastisol, irrespective of the coating thickness, and hence are more suitable for damping mechanical vibration.

Figure 2:
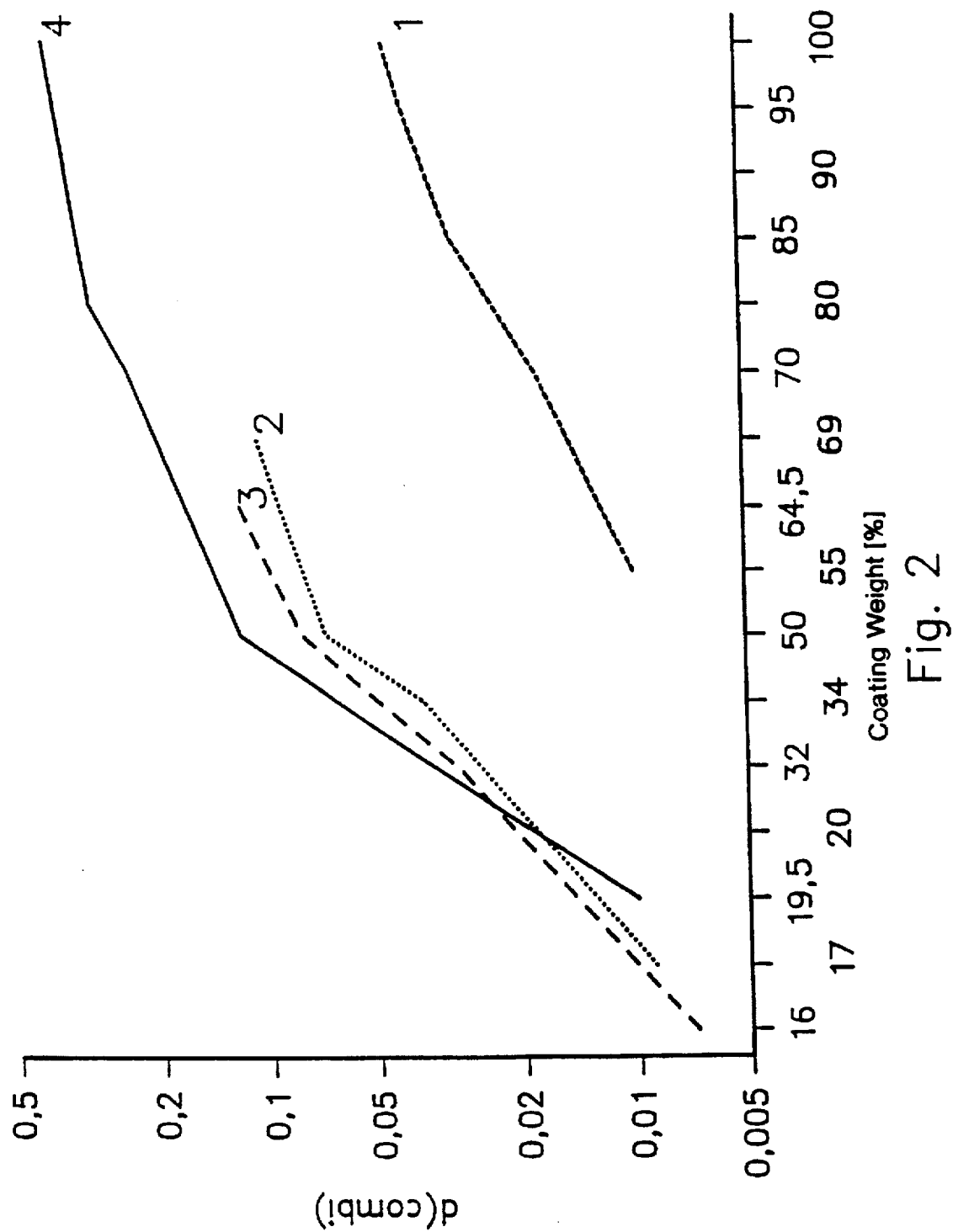

FIG. 2 shows the dependence of the loss factor on the weight of the coating. Curve 1 relates to the conventional PVC plastisol of the Comparison Example, curves 2 and 3 relate to Examples 14 and 18 according to the invention while curve 4 relates to Example 19 according to the invention. It can be seen from FIG. 2 that, even with high coating weights, only very low damping values can be achieved with PVC plastisols whereas entirely satisfactory loss factors of around 0.1 (curves 2,3,4) can be obtained with the plastisols according to the invention from a coating weight of only 50%.

Figure 3:
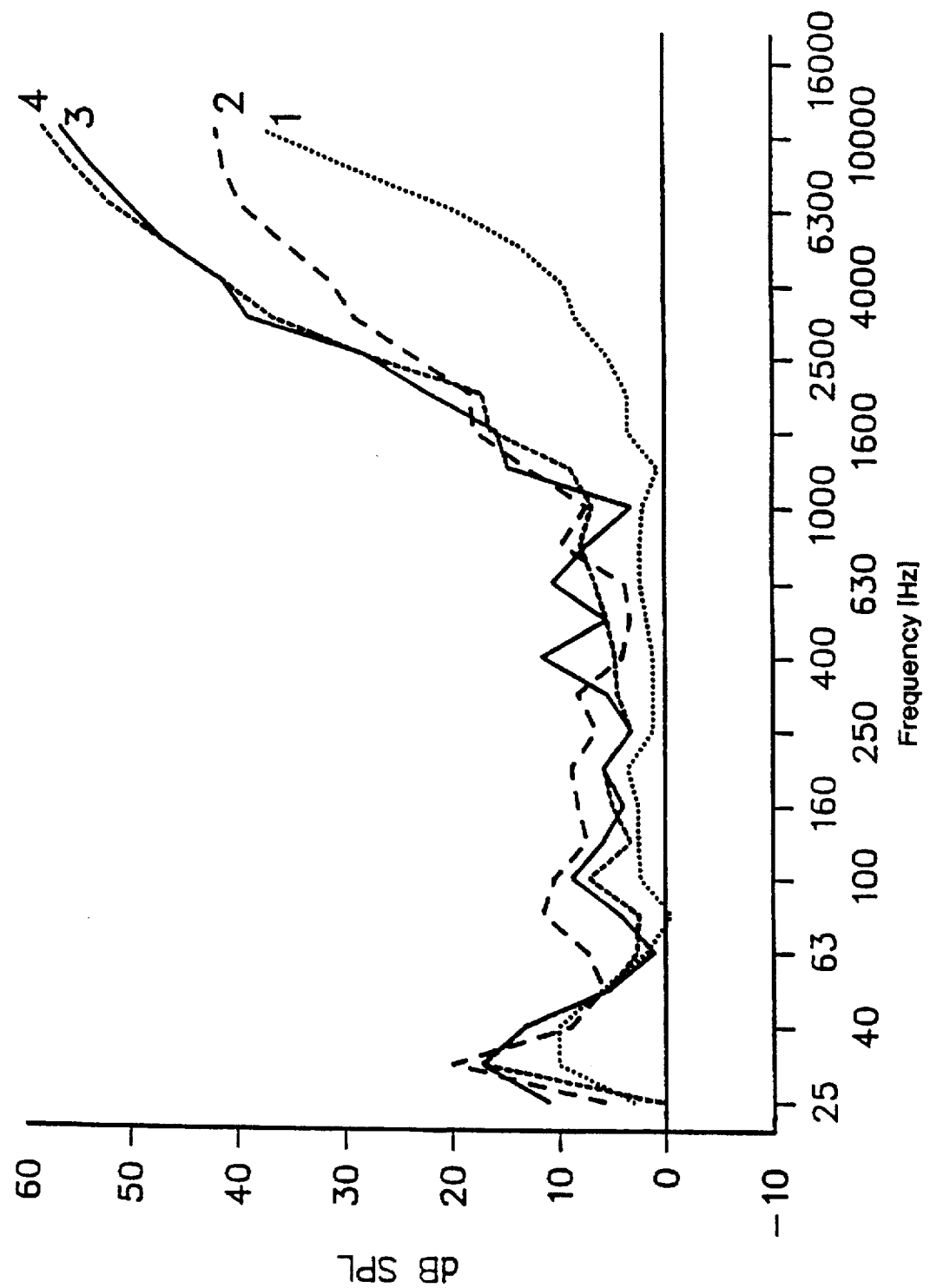
FIG. 3 is a graph illustrating the test results of the metal plates as a function of frequency in the APAMAT test.

FIG. 3 shows the test results of the compositions. of Example 19 (curve 3) and Example 20 (curve 4) against a conventional PVC plastisol of the Comparison Example (curve 1) and a PP/EPDM plate (curve 2) which was applied to the test strip. It can also be clearly seen from this figure that, particularly at the relatively high frequencies beyond about 1,000 Hz at which the human ear is particularly sensitive, noise reduction is significantly greater (curves 3,4) when the strips are coated with the plastisols according to the invention than when known compositions are applied (curves 1,2).

We claim:

1. In a method of reducing sound emission and mechanical vibration in a metal plate, the improvement comprising; applying to the metal plate a sprayable plastisol composition comprising a powder-form organic polymer and a plasticizer for the organic polymer and gelling the pastisol composition, wherein said plastisol composition comprises:

a) 5 to 60% by weight of at least one powder-form polymer selected from the group consisting of i) copolymers consisting essentially of styrene residues and 2 to 20% by weight of the polymer of residues of an olenfinically unsaturated carboxylic acid coupling monomer, ii) copolymers consisting essentially of styrene, 2 to 20% by weight of residues of an olefinically unsaturated carboxylic acid coupling monomer, and 0.2 to 5% by weight of residues of an olefinically unsaturated crosslinking comonomer having a functional group which is not a carboxyl group and which does not react during the radical polymerization, iii) alkyl methacrylate homopolymers, iv) copolymers consisting essentially of alkyl methacrylate residues and from 0.5% to 4% by weight of residues of an olefinically unsaturated coupling or crosslinking comonomer having a functional group which does not react during the radical polymerization, v) copolymers of alkyl methacrylate and methyl methacrylate, vi) copolymers consisting essentially of alkyl methacrylate residues, methyl methacrylate residues, and from 0.5% to 4% by weight of residues of an olefinically unsaturated coupling or crosslinking comonomer having a functional group which does not react during the radical polymerization, and vii) mixtures of at least two of said homopolymers and copolymers of groups i) to vi);

b) 5 to 65% by weight of plasticizers;

c) 0 to 40% by weight of fillers; and d) 2 to 40% by weight of reactive additives.

2. The method as claimed in claim 1 wherein said coating reduces the noise caused by particle impact.

3. The method as claimed in claim 1 wherein the copolymer of alkyl methacrylate and methyl methacrylate contains 5 to 48% by weight of residues of a $C_{2-8}$ alkyl ester of methacrylic acid and 0.5 to 4% by weight of residues a coupling or crosslinking comonomer, based on the monomer composition.

4. The method as claimed in claim 1 wherein said alkyl methacrylate homopolymer is a $C_{1-8}$ a alkyl ester of methacrylic acid.

5. The method as claimed in claim 1 wherein said alkyl methacrylate of said copolymer of an alkyl methacrylate and 0.5 to 4% by weight of a coupling or crosslinking comonomer is a $C_{1-8}$ alkyl ester of mathacrylic acid.

6. The method as claimed in claim 1 wherein said plastisol composition further contains a blowing agent.

7. The method as claimed in claim 6 wherein said blowing agent is selected from the group consisting of azo compounds, N-nitroso compounds, sulfonyl hydrazides or sulfonyl semicarbazides.

8. The method as claimed in claim 1 wherein said coating also protects said metal plate against abrasion or corrosion.

9. The method as claimed in claim 1 wherein said metal plate is in the wheel arches or underbody of a motor vehicle.

10. The method as claimed in claim 1 wherein said olefinically unsaturated carboxylic acid is selected from the group consisting of methacrylic acid, acrylic acid, itaconic acid, and mixtures thereof.

11. In a method of reducing sound emission and mechanical vibration in automotive vehicles, the improvement comprising applying to a rigid substrete of the automotive vehicle a sprayable plastisol composition comprising powder-form organic polymers and plasticizers, wherein said plastisol composition is comprised of:

a) 5 to 60% by weight of at least one powder-form polymer selected from the group consisting of i) copolymers consisting essentially of styrene residues end 2 to 20% by weight of the copolymer of residues of an olefinically unsaturated carboxylic acid selected from the group consisting of methacrylic acid, acrylic acid, itaconic acid, and mixtures thereof, ii) copolymers consisting essentially of styrene residues, 2 to 20% by weight of residues of an olefinically unsaturated carboxylic acid selected from the group consisting of methacrylic acid, acrylic acid, itaconic acid, and mixtures of two or more thereof, and 0.2 to 5% by weight of residues of an olefinically unsaturated crosslinking comonomer having a functional group which is not a carboxyl group and which does not react during the radical polymerization, iii) $C_{2-8}$ alkyl methacrylate homopolymers, iv) copolymers consisting essentially of $C_{28}$ alkyl methacrylate residues and from 0.5% to 4% by weight of residues a coupling or crosslinking comonomer selected from the group consisting of N-vinyl imidazole, acrylic acid, methacrylic acid, and itaconic acid, v) copolymers of a $C_{2-8}$ alkyl methacrylate and methyl methacrylate, vi) copolymers consisting essentially of $C_{2-8}$ alkyl methacrylate residues, methyl methacrylate residues, and from 0.5% to 4% by weight of a coupling or crosslinking comonomer selected from the group consisting of N-vinyl imidazole, acrylic acid, end methacrylic acid, and vii) mixtures of at least two of said homopolymers and copolymers of groups i) to vi);

b) 5 to 65% by weight of plasticizers;

c) 0 to 40% by weight of fillers;

d) 2 to 40% by weight of reactive additives; end e) a blowing agent selected from the group consisting of azo compounds, N-nitroso compounds, sulfonyl hydrazides or sulfonyl semicarbazides and gelling the plastisol composition.

12. In a method of reducing sound emission and mechanical vibration in automotive vehicles comprising metal, the improvement comprising filling the cavities of the vehicle with a sprayable plastisol composition comprising powder-form organic polymers end plasticizers, wherein said plastisol composition is comprised of:

a) 5 to 60% by weight of at least one powder-form polymer selected from the group consisting of i) copolymers comprised of styrene residues and 2 to 20% by weight of residues of an olefinically unsaturated carboxylic acid, ii) copolymers comprised of styrene residues, 2 to 20% by weight of residues of an olefinically unsaturated carboxylic acid, and 0.2 to 5% by weight of residues of crosslinking comonomer having olefinic unsaturation and having a functional group which is not a carboxyl group end which does not react during radical polymerization, iii) alkyl methacrylate homopolymers, iv) copolymers of an alkyl methacrylate and from 0.5% to 4% by weight of a coupling or cross-linking comonomer, v) copolymers of an alkyl methacrylate and methyl methacrylate, vi) copolymers of an alkyl methacrylate, methyl methacrylate, and from 0.5% to 4% by weight of a coupling or crosslinking comonomer, and vii) mixtures of at least two of said homopolymers and copolymers of groups i) to vi);

b) 5 to 65% by weight of plasticizers;

c) 0 to 40% by weight of fillers; and d) 2 to 40% by weight of reactive additives; and celling the plastisol composition.

13. The method as claimed in claim 12 wherein said filling prevents air vibration in the cavities.

14. The method as claimed in claim 12 wherein the copolymer of an alkyl methacrylate and methyl methacrylate copolymer contains 5 to 48% by weight of a $C_{2-8}$ alkyl ester of methacrylic acid and 0.5 to 4% by weight of a coupling or crosslinking comonomer, based on the monomer composition.

15. The method as claimed in claim 12 wherein said alkyl methacrylate homopolymer is a polymer of $C_{1-8}$ alkyl esters of methacrylic acid.

16. The method as claimed in claim 12 wherein said alkyl methacrylate of said copolymer of an alkyl methacrylate and 0.5 to 4% by weight of a coupling or crosslinking comonomer is a $C_{1-8}$ alkyl ester of methacrylic acid.

17. The method as claimed in claim 12 wherein said plastisol composition further contains a blowing agent.

18. The method as claimed in claim 17 wherein said blowing agent is selected from the group consisting of azo compounds, N-nitroso compounds, sulfonyl hydrazides or sulfonyl semicarbazides.

19. The method as claimed in claim 12 wherein said filling also protects said metal against abrasion or corrosion.

20. The method as claimed in claim 12 wherein said cavity is in the roof cross-ties or the A-, B-, or, C-pillars of a motor vehicle.

21. The method as claimed in claim 12 wherein said olefinically unsaturated carboxylic acid is selected from the group consisting of methacrylic acid, acrylic acid, itaconic acid, and mixtures of two or more thereof.

22. In a method of reducing sound emission and mechanical vibration in automotive vehicles, the improvement comprising applying to a cavity of a motor vehicle a sprayable plastisol composition comprising a powder-form organic polymer and a plasticizer, wherein said plastisol composition is comprised of;

a) 5 to 60% by weight of at least one powder-form polymer selected from the group consisting of i) copolymers comprised of styrene residues and 2 to 20% by weight of residues of an olefinically unsaturated carboxylic acid selected from the group consisting of methacrylic acid, acrylic acid, itaconic acid, and mixtures of two or more thereof, ii) copolymers comprised of styrene residues, 2 to 20% by weight of residues of an olefinically unsaturated carboxylic acid selected from the group consisting of methacrylic acid, acrylic acid, itaconic acid, and mixtures of two or more thereof, and 0.2 to 5% by weight of residues of another crosslinking comonomer, iii) $C_{2-8}$ alkyl methacrylate homopolymers, iv) copolymers of a $C_{28}$ alkyl methacrylate and from 0.5% to 4% by weight of a coupling or crosslinking comonomer selected from the group consisting of N-vinyl imidazole, acrylic acid, methacrylic acid, and itaconic acid, v) copolymers of a $C_{2-8}$ alkyl methacrylate and methyl methacrylate, vi) copolymers of a $C_{28}$ alkyl methacrylate, methyl methacrylate, and from 0.5% to 4% by weight of a coupling or crosslinking comonomer selected from the group consisting of N-vinyl imidazole, acrylic acid, and methacrylic acid, and vii) mixtures of at least two of said homopolymers and copolymers of groups i) to vi);

b) 5 to 65% by weight of plasticizers;

c) 0 to 40% by weight of fillers;

d) 2 to 40% by weight of reactive additives; and e) a blowing agent selected from the group consisting of azo compounds, N-nitroso compounds, sulfonyl hydrazides or sulfonyl semicarbazides.

* * * * *